United States Patent
Keys et al.

(10) Patent No.: US 7,551,923 B1
(45) Date of Patent: *Jun. 23, 2009

(54) SYSTEM AND METHOD FOR IMPROVED SPECTRUM USE

(75) Inventors: Kraig Keys, Tampa, FL (US); Christopher Scott Erwin, Wesley Chapel, FL (US); Richard Bruno, Plantation, FL (US); David Bogart, Heathrow, FL (US); Martin Chang, Longwood, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 454 days.

This patent is subject to a terminal disclaimer.

(21) Appl. No.: 11/279,306

(22) Filed: Apr. 11, 2006

Related U.S. Application Data (63) Continuation of application No. 10/242,864, filed on Sep. 13, 2002, now Pat. No. 7,065,352.

(51) Int. Cl.
*H04Q 7/20* (2006.01)

(52) U.S. Cl. .................... 455/424; 455/562.1; 455/423; 455/515; 455/115.1; 455/561

(58) Field of Classification Search ......... 455/423–424, 455/560–562.1, 550.1, 552.1–553.1, 115.1, 455/67.11–67.14, 126, 127.1, 168.1, 102–103, 455/296, 515

See application file for complete search history.

(56) References Cited

U.S. PATENT DOCUMENTS

| | | | |
|---|---|---|---|
| 5,507,010 A * | 4/1996 | Ahonen | 455/67.14 |
| 5,521,904 A * | 5/1996 | Eriksson et al. | 370/249 |
| 5,574,981 A * | 11/1996 | Ahonen | 455/67.14 |
| 5,854,986 A | 12/1998 | Dorren et al. | |
| 6,516,206 B2 | 11/2001 | Jantti | |
| 6,804,540 B1 | 10/2004 | Sheppard et al. | |
| 7,065,352 B2 * | 6/2006 | Bogart et al. | 455/424 |
| 7,200,393 B2 * | 4/2007 | Bogart et al. | 455/424 |
| 7,242,930 B2 * | 7/2007 | Bogart et al. | 455/424 |
| 2002/0137547 A1 | 9/2002 | Judson | |
| 2003/0073463 A1 | 4/2003 | Shapira | |

* cited by examiner

*Primary Examiner*—Kamran Afshar
(74) *Attorney, Agent, or Firm*—Parks Knowlton LLC; Paul Knowlton, Esq.; Adam J. Citrin, Esq.

(57) ABSTRACT

A method for improving the use of a transmission spectrum in a multi-sector wireless communication system includes generating a first signal, processing a first signal with a first Auto Tune Combiner, transmitting the first signal on an antenna associated with a first sector, sampling the first signal with a radio frequency test device, generating a second signal, processing the second signal with a second Auto Tune Combiner, transmitting the second signal on an antenna associated with a second sector, and sampling the second signal with the radio frequency test device.

19 Claims, 8 Drawing Sheets

Figure 1 (Prior Art)

Channel Sets (First Row is the Set Number)

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|----|----|----|----|----|----|----|----|----|----|----|----|
| 1 | 2 | 3 | 4 | 5 | 6 | 7 | 8 | 9 | 10 | 11 | 12 | 13 | 14 | 15 | 16 | 17 | 18 | 19 | 20 | 21 |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 | 99 | 100 | 101 | 102 | 103 | 104 | 105 |
| 106 | 107 | 108 | 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 | 145 | 146 | 147 |
| 148 | 149 | 150 | 151 | 152 | 153 | 154 | 155 | 156 | 157 | 158 | 159 | 160 | 161 | 162 | 163 | 164 | 165 | 166 | | |

Figure 2A
(Prior Art)

Channel Sets (First Row is the Set Number)

| 1 | 2 | 3 | 4 | 5 | 6 | 7 | 8 | 9 | 10 | 11 |
|---|---|---|---|---|---|---|---|---|----|----|
| 1 | 2 | 3 | 4 | 5 | 6 | 7 | 8 | 9 | 10 | 11 |
| 12 | 13 | 14 | 15 | 16 | 17 | 18 | 19 | 20 | 21 | 22 |
| 23 | 24 | 25 | 26 | 27 | 28 | 29 | 30 | 31 | 32 | 33 |
| 34 | 35 | 36 | 37 | 38 | 39 | 40 | 41 | 42 | 43 | 44 |
| 45 | 46 | 47 | 48 | 49 | 50 | 51 | 52 | 53 | 54 | 55 |
| 56 | 57 | 58 | 59 | 60 | 61 | 62 | 63 | 64 | 65 | 66 |
| 67 | 68 | 69 | 70 | 71 | 72 | 73 | 74 | 75 | 76 | 77 |
| 78 | 79 | 80 | 81 | 82 | 83 | 84 | 85 | 86 | 87 | 88 |
| 89 | 90 | 91 | 92 | 93 | 94 | 95 | 96 | 97 | 98 | 99 |
| 100 | 101 | 102 | 103 | 104 | 105 | 106 | 107 | 108 | 109 | 110 |
| 111 | 112 | 113 | 114 | 115 | 116 | 117 | 118 | 119 | 120 | 121 |
| 122 | 123 | 124 | 125 | 126 | 127 | 128 | 129 | 130 | 131 | 132 |
| 133 | 134 | 135 | 136 | 137 | 138 | 139 | 140 | 141 | 142 | 143 |
| 144 | 145 | 146 | 147 | 148 | 149 | 150 | 151 | 152 | 153 | 154 |
| 155 | 156 | 157 | 158 | 159 | 160 | 161 | 162 | 163 | 164 | 165 |
| 166 | | | | | | | | | | |

Figure 2B
(Prior Art)

Channel Sets (First Row is the Set Number)

| 1 | 2 | 3 | 4 |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |
| 33 | 34 | 35 | 36 |
| 37 | 38 | 39 | 40 |
| 41 | 42 | 43 | 44 |
| 45 | 46 | 47 | 48 |
| 49 | 50 | 51 | 52 |
| 53 | 54 | 55 | 56 |
| 57 | 58 | 59 | 60 |
| 61 | 62 | 63 | 64 |
| 65 | 66 | 67 | 68 |
| 69 | 70 | 71 | 72 |
| 73 | 74 | 75 | 76 |
| 77 | 78 | 79 | 80 |
| 81 | 82 | 83 | 84 |
| 85 | 86 | 87 | 88 |
| 89 | 90 | 91 | 92 |
| 93 | 94 | 95 | 96 |
| 97 | 98 | 99 | 100 |
| 101 | 102 | 103 | 104 |
| 105 | 106 | 107 | 108 |
| 109 | 110 | 111 | 112 |
| 113 | 114 | 115 | 116 |
| 117 | 118 | 119 | 120 |
| 121 | 122 | 123 | 124 |
| 125 | 126 | 127 | 128 |
| 129 | 130 | 131 | 132 |
| 133 | 134 | 135 | 136 |
| 137 | 138 | 139 | 140 |
| 141 | 142 | 143 | 144 |
| 145 | 146 | 147 | 148 |
| 149 | 150 | 151 | 152 |
| 153 | 154 | 155 | 156 |
| 157 | 158 | 159 | 160 |
| 161 | 162 | 163 | 164 |
| 165 | 166 |  |  |

SYSTEM AND METHOD FOR IMPROVED SPECTRUM USE

CROSS REFERENCE TO RELATED APPLICATIONS

This application is a continuation of U.S. application Ser. No. 10/242,864 filed Sep. 13, 2002 now U.S. Pat. No. 7,065,352, which contents are hereby incorporated by reference.

BACKGROUND OF THE INVENTION

The present invention relates to a method and apparatus for the transmission of communications signals in a wireless network. More particularly, the present invention relates to a method and apparatus for enhancing spectrum utilization at a wireless communications transmission site.

In a wireless communications system, a wireless carrier is often limited in the amount of radio frequency spectrum it can use in the operation of the site. For example, in an e-band license, a wireless carrier may only be allotted 5 MHz of spectrum to use for transmitting wireless signals. This 5 MHz of spectrum must be divided into channels on which wireless signals are transmitted. In a typical configuration, 30 kHz channels are used, which means that a 5 MHz spectrum may be divided into approximately 166 different channels. In this manner, a wireless carrier, at a particular wireless communications site, is limited to these 166 different channels.

Further limitations on the use of these 166 different channels are imposed by the equipment used in a wireless communications site. Depending on the type of equipment used, not all of the 166 channels may be available for transmission at a particular time. The inability to use most of the 166 channels creates difficulty in the operation of the wireless communications system.

If the full 5 MHz of spectrum cannot be utilized, then additional wireless communications sites may need to be constructed. The construction of a wireless communications site involves considerable time and expense. A typical site, such as a cellular site, involves the construction of a tower and an accompanying building to house the electronic equipment necessary to operate the site. Land must be purchased, zoning regulations must be complied with, funds for construction must be outlaid, and time must be invested in constructing the site. Therefore, it is desirable to avoid constructing additional sites by fully utilizing the available spectrum allotted to a wireless carrier.

Figure 1:
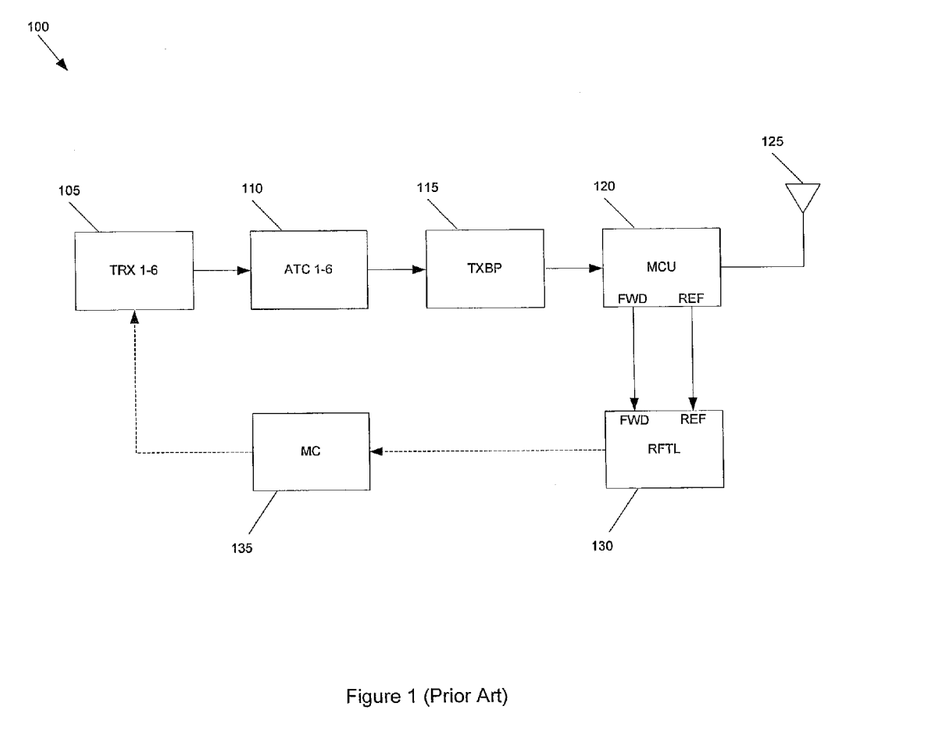
FIG. 1 is a block diagram of a wireless communications system implemented in the prior art.

FIG. 1 illustrates a conventional configuration of a wireless communications site. This site 100, which is typically a cellular site, generally includes a set of radio frequency sources 105, a set of Auto Tune Combiners 110, a band pass filter 115, a multicoupler unit 120, an antenna 125, a radio frequency test loop device 130, and a multicoupler 135. All of these components except the antenna 125, are typically housed in a small building at the wireless communications site. The antenna 125 is typically mounted to a tower which is also at the site.

In the typical configuration of FIG. 1, the set of radio frequency sources 105 are interconnected to the set of Auto Tune Combiners 110. The set of Auto Tune Combiners 110 is then connected to band pass filter 115 which is then connected to multicoupler unit 120. Multicoupler unit 120 is interconnected to antenna 125 and radio frequency test loop device 130. Radio frequency test loop device 130 is connected to multicoupler 135, which is then connected to radio source 105.

Typically, the set of radio frequency sources 105 comprises multiple radios—in this case, six 30 watt radios. Each of these 30 watt radios is typically housed in a cabinet contained within a small building adjacent to the tower at the wireless communications site. Each of these 30 watt radios generates a signal at a particular frequency or on a particular channel that is later transmitted on antenna 125. In this configuration of six radios, the transmission on antenna 125 is limited to six different frequencies or six different channels. Generally, the number of radios is limited only by the spectrum that is assigned to a wireless carrier as well as the space available in the cabinet and small building at the wireless communications site. In other typical configurations, more than six radios are employed at a given site.

The signal generated by each of the six radios then passes to one of the Auto Tune Combiners 110. In the typical configuration, each individual radio has associated with it a single Auto Tune Combiner. In this case, the set of Auto Tune Combiners 110 comprises six separate Auto Tune Combiners that are cabled together. Usually, these six different Auto Tune Combiners are all interconnected to an Auto Tune Combiner Controller (not shown), which controls the operation of the six individual Auto Tune Combiners. An Auto Tune Combiner functions to combine all of the different signals produced by the radios to get maximum power out to the antenna. In this case, the six 30 watt radios produce six signals at six different frequencies. The Auto Tune Combiner takes these six signals at the six different frequencies and combines them so as to form one signal that is transmitted by antenna 125.

After the Auto Tune Combiners 110 process the signals from the six radios 105, the resulting output is passed through band pass filter 115. Band pass filter 115, in a typical configuration, operates to ensure that the transmission on antenna 125 is within a prespecified frequency range. In this case, a wireless provider with 5 MHz of spectrum available would configure band pass filter 115 so that any signal transmitted on antenna 125 would be within the 5 MHz spectrum.

After the signal is filtered by band pass filter 115, it passes to multicoupler unit 120. Multicoupler unit 120 serves typically as a connection point for antenna 125 as well as a sampling point for radio frequency test loop device 130. A coaxial cable typically connects multicoupler 120 to antenna 125. It is across this cable that the signal is sent to antenna 125 for transmission. In addition, multicoupler unit 120 has two test points, a forward signal test point and a reflected signal test point. The forward signal test point of multicoupler unit 120 is connected to the forward port of radio frequency test loop device 130 and the reflected signal test point on multicoupler unit 120 is connected to the reflected port of radio frequency test loop device 130.

Radio frequency test loop device 130 (RFTL) samples the forward and reflected signals from multicoupler unit 120. The forward signal path is the path taken by the signal that is transmitted on antenna 125. The reflected path is the signal or power reflected back from antenna 125. RFTL 130 takes measurements of the forward path signal and the reflected path signal to verify that the six radios are each transmitting at a proper power. The RFTL 130 verifies the power of each frequency and sends signals to the radios to increase or decrease power. Additionally, RFTL 130 verifies that the antenna is operating properly. A control signal is sent by RFTL 130 through multicoupler 135 to each of the six radios contained in radio frequency source 105.

In sum, each of the six radios comprising radio frequency source 105 produces six different signals on six different frequencies. These six different signals are sent to six different Auto Tune Combiners that are cabled together to form Auto Tune Combiner 110. The Auto Tune Combiners combine the six different signals so as to allow maximum power transmission on antenna 125. The resulting signal is then filtered through band pass filter 115 and sent to antenna 125 through multicoupler unit 120. RFTL 130 samples the forward and reflected paths of the resulting signal from the forward and reflected connections on multicoupler unit 120. RFTL 130 then performs measurements on the forward and reflected paths to determine whether or not the radios are operating at the proper power as well as whether the antenna itself is operating properly. RFTL 130 then sends a feedback signal through multicoupler 135 to each of the six radios comprising radio frequency source 105.

The typical configuration described with reference to FIG. 1 may be implemented with an Ericsson RBS 884 system. This system typically comes in two different frequency bands, 1900 MHz and 850 MHz. Each of the components of the Ericsson RBS 884 system have certain limitations which constrain the number of channels that can be used in a given frequency spectrum.

The Auto Tune Combiners of this system are specified by Ericsson to require a 21 channel separation. In this case, channels are 30 kHz apart so that a 21 channel separation requires 630 kHz of spectrum. In the example of FIG. 1, this means that each of the six different radios contained in radio frequency source 105 must generate radio signals with frequencies that are at least 630 kHz apart. In a 5 MHz spectrum, this means that at most eight radios may transmit signals on antenna 125 at the same time.

Figure 2A:
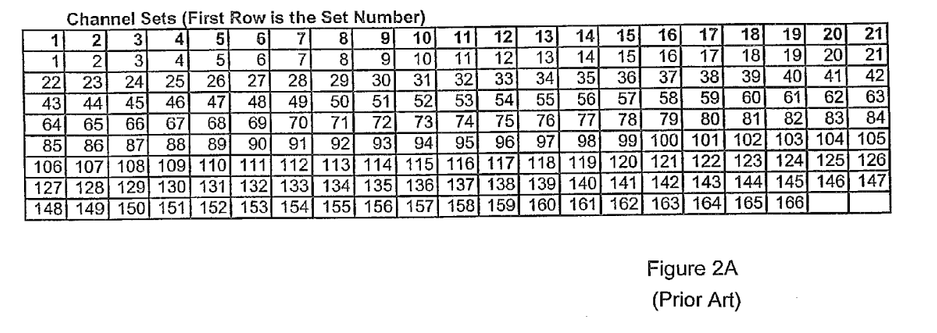
FIGS. 2A, 2B, and 2C depict channel sets utilized in conjunction with the prior art, as well as in conjunction with the present invention.

This limitation is illustrated more clearly in FIG. 2A, which is a table depicting the 166 available channels in a 500 MHz spectrum divided into 21 different sets. To honor the 21 channel separation specified by Ericsson, the radio frequency source 105 which comprises multiple radios may only operate on one set of the channel sets depicted in FIG. 2A. As can be seen, the channel sets each contain channels that are separated by 630 kHz or 21 channels. In the typical configuration of FIG. 1, the multiple radios of radio frequency source 105 would be able to use, for example, channel set 2 which comprises channels 2, 23, 44, 65, 86, 107, 128 and 149. The multiple radios of radio frequency source 105 would not be able to use any of the other channels depicted in the table of FIG. 2A because each of these other channels is closer than 21 channels to the given channel set. Practically, this means that out of a possible 5 MHz spectrum comprising 166 30 kHz channels, only eight different channels can be used at the same time. This greatly limits the amount of capacity at a particular wireless communications site.

Figure 2B:
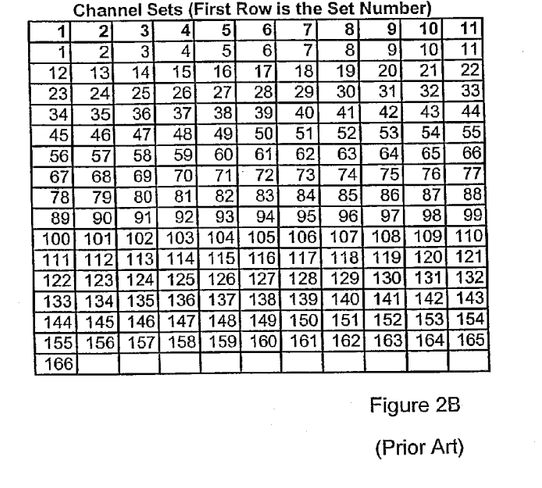

Through experimentation, the inventors have found that the Auto Tune Combiners of the Ericsson RBS 884 system, without any additional manipulation, can operate with an 11 channel separation. In this case, the signals generated by the radios of radio frequency source 105 must be at least 11 channels or 330 kHz apart. This greatly increases the number of frequencies that can be used at the same time by wireless transmission system 100. For example, each of the six different radios of radio frequency source 105 will be able to use six different channels that are 11 channels or 330 kHz apart simultaneously. FIG. 2B depicts channel sets that are 11 channels apart. In FIG. 2B, the entire 166 channels of a 5 MHz spectrum are divided into 11 different sets. Each of these 11 different sets contains channels that are 11 channels or 330 kHz apart. As can be seen, each of these sets contains at least six channels. Therefore, each of the six radios of radio frequency source 105 can operate simultaneously on the six different channels of a given set of FIG. 2B. Even with this 11 channel limitation, however, as can be seen in FIG. 2B, only 15 out of a possible 166 channels can be utilized at the same time. This greatly limits the amount of capacity that can be handled by a given wireless communications site.

A further limitation imposed by the Ericsson RBS 884 is found in RFTL 130. RFTL 130 requires four channel separation. This means that the radio frequency signals that are transmitted on antenna 125 and sampled by RFTL 130 must be four channels 120 kHz apart. In the typical configuration of FIG. 1, however, the 11 channel separation of the Auto Tune Combiner 110 takes precedence over the four channel separation of RFTL 130. In other words, the 11 channel separation associated with Auto Tune Combiner 110 must be respected, which would also respect the four channel separation of RFTL 130. In sum, the typical configuration of FIG. 1 requires an 11 channel separation which greatly reduces the amount of a given spectrum that can be utilized.

Applicants have recognized the disadvantage of the limitations imposed by the typical configuration of FIG. 1 and have discovered a method and apparatus to overcome these limitations.

SUMMARY OF THE INVENTION

In an aspect consistent with the general principles of the present invention, a method for improving the use of a transmission spectrum in a multi-sector wireless communication system includes generating a first signal, processing a first signal with a first Auto Tune Combiner, transmitting the first signal on an antenna associated with a first sector, sampling the first signal with a radio frequency test device, generating a second signal, processing the second signal with a second Auto Tune Combiner, transmitting the second signal on an antenna associated with a second sector, and sampling the second signal with the radio frequency test device.

In another aspect of the present invention, an apparatus for improving the use of a transmission spectrum in a wireless communication system includes a first radio source for generating a first signal, a first Auto Tune Combiner for processing the first signal, a first antenna associated with a first sector for transmitting the first signal, a second radio source for generating a second signal, a second Auto Tune Combiner for processing the second signal, a second antenna associated with a second sector for transmitting the second signal, and a radio frequency test device for sampling the first and second signals.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

The configuration of the components in the exemplary embodiments of the present invention allows a wireless communications system to overcome the limitations noted in the background section. As previously described, the Auto Tune Combiners of the Ericsson RBS884 system have an 11-channel separation limitation, and the radio frequency transmit loop devices have a 4-channel separation limitation. The configuration of the present invention, however, allows transmission on adjacent channels in the same sector by splitting the transmit paths and sharing RFTL devices among radios transmitting on different sectors. By associating radios that transmit on the same sector with different Auto Tune Combiners and different RFTL cards, the signals generated by these radios can reside on adjacent channels. Therefore, a tighter use of spectrum can be achieved in a given sector.

Consistent with the general principles of the present invention, an apparatus for improving the use of a transmission spectrum in a wireless communications system includes a first set of radio sources for generating a first set of signals, a first set of components for processing the first set of signals for transmission, a first antenna associated with a first sector for transmitting the first set of signals, a second set of radio sources for generating the second set of signals, a second set of components for processing the second set of signals for transmission, a second antenna associated with a second sector for transmitting a second set of signals, and a sampling device for sampling the transmitted first and second sets of signals.

Figure 4:
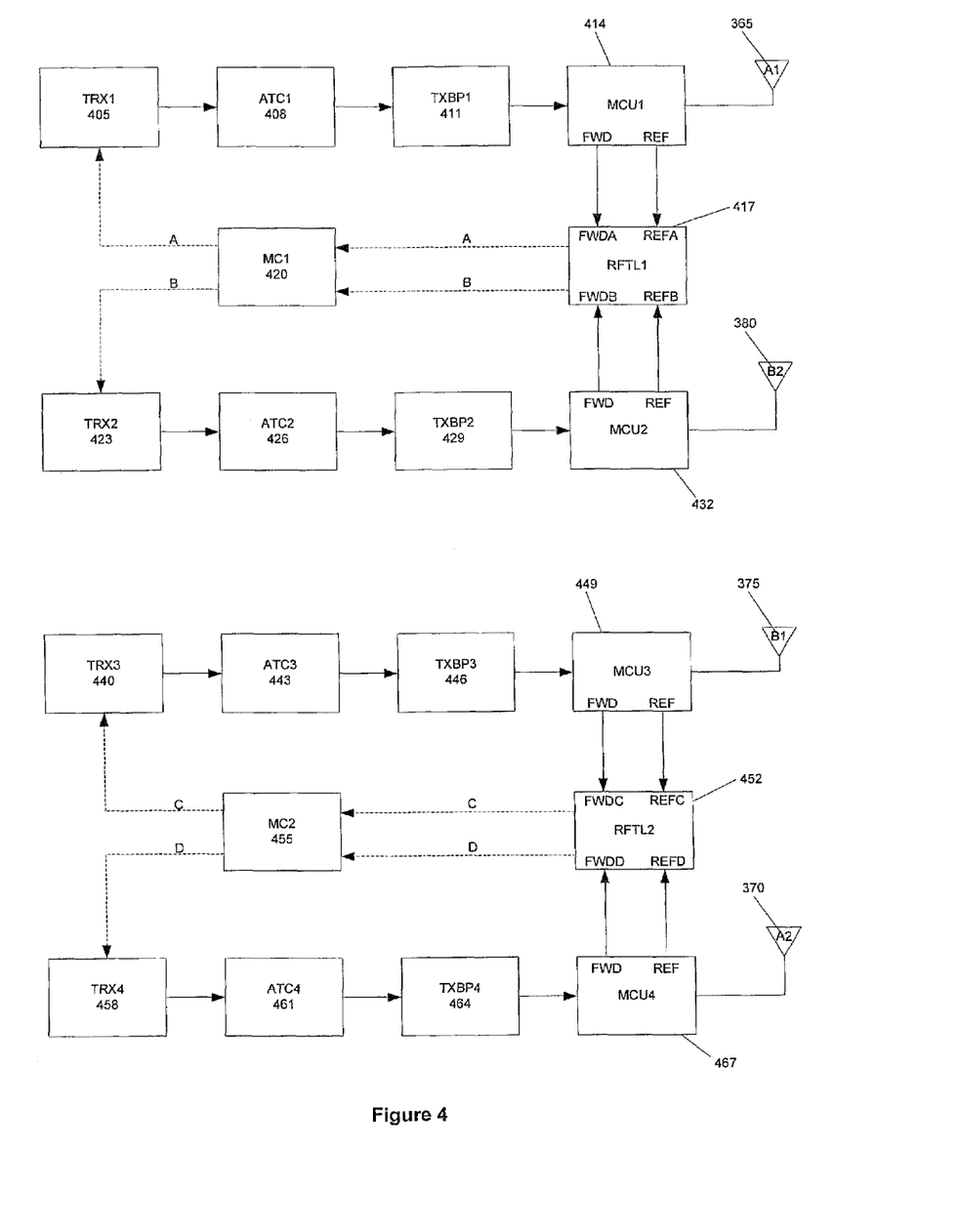
FIG. 4 is a block diagram of a wireless communications system consistent with the principles of the present invention.

As herein embodied and illustrated in FIG. 4, an apparatus for improving the use of a transmission spectrum in a multi-sector wireless communications system may include a first radio 405, a first Auto Tune Combiner (ATC1) 408, a first band pass filter 411, a first multi-coupler unit (MCU1) 414, a first antenna associated with a first sector (Antenna A1) 365, a first radio frequency test loop device (RFTL1) 417, a first multi-coupler 420, a second radio 423, a second Auto Tune Combiner (ATC2) 426, a second band pass filter 429, a second multicoupler unit (MCU2) 432, and a second antenna associated with a second sector (Antenna B2) 380. Further, the exemplary apparatus depicted in FIG. 4 may include a third radio 440, a third Auto Tune Combiner (ATC3) 443, a third band pass filter 446, a third multi-coupler unit (MCU3) 449, a first antenna associated with a second sector (Antenna B1) 375, a second radio frequency test loop device (RFTL2) 452, a second multi-coupler 455, a fourth radio 458, a fourth Auto Tune Combiner (ATC4) 461, a fourth band pass filter 464, a fourth multi-coupler unit (MCU4) 467, and a second antenna associated with a first sector (Antenna A2) 370.

Figure 3A:
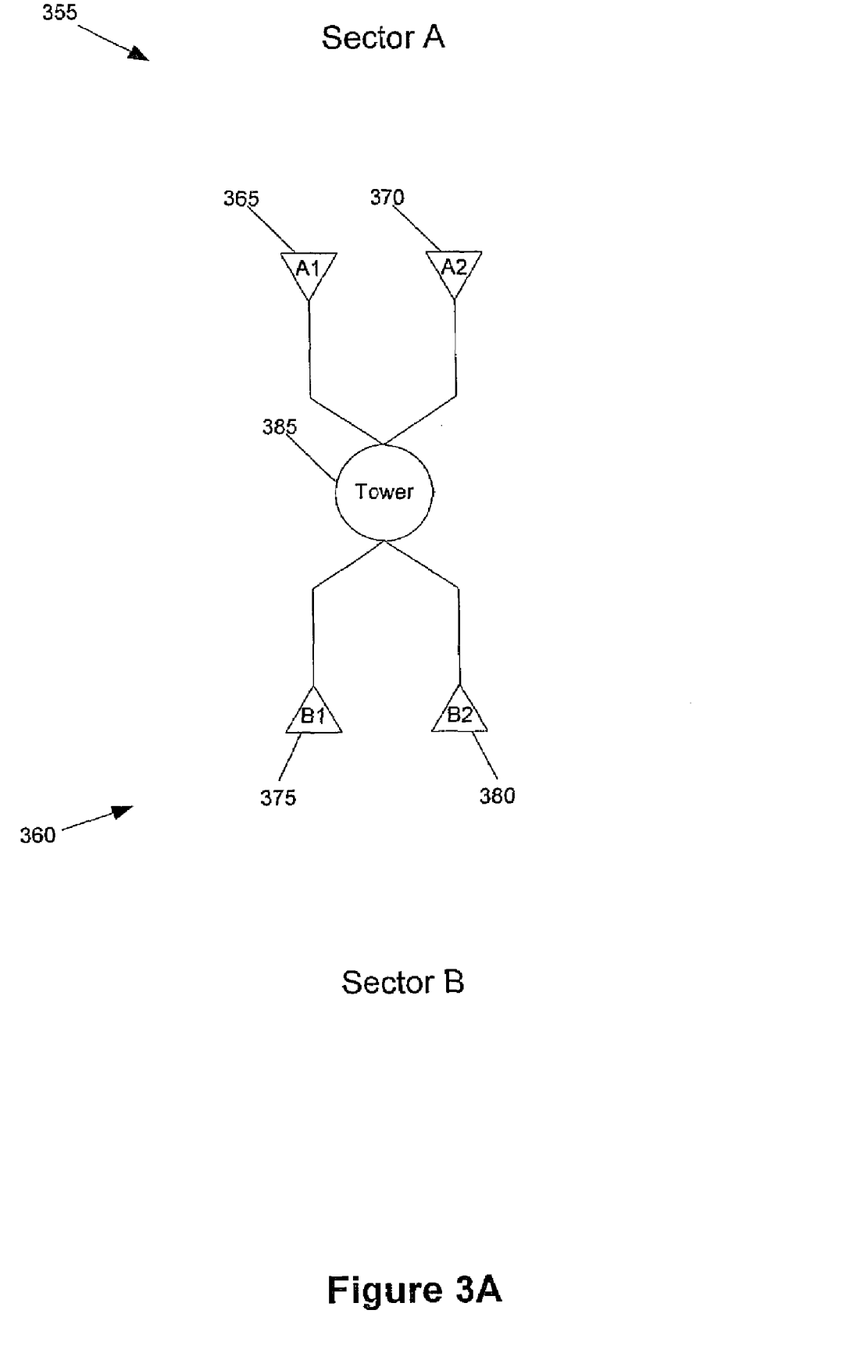
FIG. 3 is general layout diagram of the antennas in a three sector wireless communications system.

The configuration of the components of the exemplary embodiment depicted in FIG. 4 is better understood with reference to FIG. 3A. FIG. 3A depicts a two sector wireless communications system. In FIG. 3A, the transmission area is divided into two sectors, Sector A 355 and Sector B 360. At the center of the transmission area is tower 385. Two sets of antennas are mounted on tower 385. The first set of antennas, Antenna A1 365 and Antenna A2 370 transmit in Sector A 355. The second set of antennas, Antenna B1 375 and Antenna B2 380, transmit in Sector B 360. The antennas depicted in the apparatus of FIG. 4, in this example, correspond to the antennas depicted in FIG. 3A. In this manner, first radio 405 and fourth radio 458 transmit in Sector A on Antenna A1 365 and Antenna A2 370, respectively. Likewise, the second radio 423 and the third radio 440 transmit in Sector B on Antenna B2 380 and Antenna B1 375, respectively.

Referring again to FIG. 4, first radio 405 generates a first signal which is transmitted to ATC1 408 for processing. After ATC1 408 processes the first signal, it then proceeds to first band pass filter 411 for filtering. After filtering, the signal passes to MCU1 414 to which Antenna A1 365 is connected. The signal is then broadcast in Sector A on Antenna A1 365. RFTL1 417 samples a forward signal and a reflected signal from MCU1 414. RFTL1 417 after performing tests on the sampled signals, submits a feedback signal to first multi-coupler 420. The feedback signal then passes from first multi-coupler 420 to first radio 405. The connections between first radio 405, ATC1 408, first band pass filter 411, MCU1 414, Antenna A1 365, RFTL1 417, first multi-coupler 420, and first radio 405 are typically implemented with cables, such as coaxial cables. In other aspects of the invention, the interconnection between these devices can be achieved in any convenient manner. As is known in the prior art, the interconnection between these devices can be implemented with cables or by wireless means. Likewise, the interconnections between the remaining components of FIG. 4 may also be via cable or via a wireless device.

In the embodiment of FIG. 4, second radio 423 is interconnected to ACT2 426. ATC2 426 is connected to second band pass filter 429. Second band pass filter 429 is connected to MCU2 432. RFTL1 417, as well as Antenna B2 380, are connected to MCU2 432. RFTL1 417 is connected to first multi-coupler 420. First multi-coupler 420 is then connected to both first radio 405 and second radio 423.

Likewise, third radio 440 is connected to ATC3 443. ATC3 443 is connected to third band pass filter 446. Third band pass filter 446 is connected to MCU3 449. RFTL2 452, as well as Antenna B1 375, are connected to MCU3 449. RFTL2 452 is connected to second multi-coupler 455. Second multi-coupler 455 is connected to both third radio 440 and fourth radio 458. Fourth radio 458 is connected to ATC4 461. ATC4 461 is connected to fourth band pass filter 464. Fourth band pass filter 464 is connected to MCU4 467. RFTL2 452, as well as Antenna A2 370, are connected to MCU4 467.

In the exemplary embodiment of FIG. 4, first radio 405, second radio 423, third radio 440, and fourth radio 458 typically are 30 Watt radios. Alternatively, these four radios can be of any wattage and generate signals of any frequency. In alternate embodiments of the present invention, these four radios can be any type of radio frequency or signal source. In a typical Ericsson RBS884 system, these four radios are 30 Watt radios. Moreover, these four radios, depending on the wireless communications system, may transmit, for example, in the 850 MHz bandwidth or the 1900 MHz bandwidth.

The Auto Tune Combiners, ATC1 408, ATC2 426, ATC3 443, and ATC4 461, as is known in the art, function to combine the signals from their attached radios to provide an optimal output power for transmission on the respective antennas. These Auto Tune Combiners provide automatic combining of a set number of transmit channels. Further, these Auto Tune Combiners typically monitor the change in operating frequency and power of their corresponding transmitters and automatically tune each channel to the correct operating frequency. In one embodiment of the present invention, the Auto Tune Combiners, as well as the other components in the system depicted in FIG. 4, may be obtained from Ericsson (such as in the Ericsson RBS884 system).

The four band pass filters, 411, 429, 446, and 464, each serve to filter the output of the Auto Tune Combiners to which they are connected. In this manner, the four band pass filters, as is known in the art, filter the output of their respective Auto Tune Combiners so that the signal transmitted on their respective antennas does not fall outside the bandwidth allocated to the wireless provider. For example, a wireless provider, in an e-band system, may be provided 5 MHz of bandwidth in which to transmit. The four band pass filters, in this example, would then filter the output of their respective Auto Tune Combiners so as to ensure that the transmitted signal falls within the allocated 5 MHz bandwidth. In this manner, the four band pass filters would each function to filter out any signals that fall outside of the specified 5 MHz bandwidth. The operation of band pass filters is known to those skilled in the art, and band pass filters are easily obtainable from any number of manufacturers, including Ericsson.

Consistent with the principles of the embodiments depicted in FIG. 4, the multi-coupler units, MCU1 414, MCU2 432, MCU3 449, and MCU4 467, each serve as a connection point for their respective antennas. In addition, these four multi-coupler units each have test ports from which a radio frequency test loop device can sample a forward signal and a reflected signal. In this manner, the multicoupler units are passive devices that serve simply to interconnect other devices of the system depicted in FIG. 4.

The antennas of the embodiment in FIG. 4, Antenna A1 365, Antenna A2 370, Antenna B1 375, and Antenna B2 380, are typically unidirectional antennas, but may be antennas of any type. In the embodiments of FIG. 3A and FIG. 4, the four antennas depicted are directional antennas which each transmit in their respective sectors. For example, Antenna A1 365 and Antenna A2 370 transmit in Sector A 355. In this case, these two antennas are unidirectional antennas that transmit in a 180 degree area. Likewise, Antennas B1 375 and B2 380 transmit in Sector B 360 and, in this case, are unidirectional antennas that transmit in a 180 degree area. While unidirectional antennas are depicted in this embodiment of the present invention, other embodiments of the present invention may employ any type of antenna. For example, a wireless communications system may be divided into any number of sectors, each with associated antennas. In the case of a multi-sectored communications system, the antennas in a particular sector are typically configured to transmit only in that sector. Alternatively, an omni-directional antenna may be used which transmits over the entire 360 degree area. The operation of these antennas is known to those skilled in the art, and these antennas can be obtained from any number of wireless equipment providers, such as Ericsson.

RFTL1 417 and RFTL2 452, in this case, are radio frequency test loop devices. As is commonly known, these radio frequency test loop devices typically verify radio power. These devices each measure the forward and reflected signals and perform tests to verify the power of each transmitting radio. These radio frequency test loop devices then send feedback signals to their respective radios. In addition, these radio frequency test loop devices typically verify the antennas by performing a voltage standing wave ratio (VSWR) measurement. RFTL1 417 and RFTL2 452 each have two sets of forward and reflected test points. In this manner, these devices may sample a forward signal and a reflected signal from two different transmit antennas as depicted in FIG. 4. In other embodiments of the present invention, various radio frequency test loop devices, such as RFTL1 417 and RFTL2 452, may contain any number of test points. RFTL1 417 and RFTL2 452 may be obtained from any number of wireless equipment providers, such as Ericsson.

First multi-coupler 420 and second multi-coupler 455, as is commonly known, serve to interconnect RFTL1 417 and RFTL2 452 with the radios that they control. In the embodiment of FIG. 4, first multi-coupler 420 allows the feedback signals produced by RFTL1 417 to pass to their respective radios. These feedback signals are depicted with dashed lines. In this case, RFTL1 417 generates two feedback signals denoted by path A and path B. Likewise, RFTL2 452 generates two feedback signals denoted by the dashed lines. Second multi-coupler 455 allows these two feedback signals, denoted C and D, to pass to their respective radios.

The operation of the system of FIG. 4 is described with respect to the first radio. The other radios operate in the same fashion. First radio 405 generates a signal at a specific frequency or on a specific channel. The signal generated by first radio 405 is then processed by ATC1 408. This processing may include, for example, combining the signal generated by first radio 405 with signals from other radios (not shown). The output of ATC1 408 is then filtered by band pass filter 411. In this manner, band pass filter 411 ensures that the signal ultimately transmitted on Antenna A1 365 remains within the allocated frequency spectrum that is assigned to a particular wireless subscriber. The band pass filter 411, therefore, ensures that no interference takes place. The output of band pass filter 411, which is the filtered and processed signal generated by first radio 405 is then passed through MCU1 414 for transmission on Antenna A1 365. While the signal is being transmitted on Antenna A1 365, RFTL1 417 samples the forward and reflected signals. RFTL1 417 performs various tests on the sampled forward and reflected signals and produces a feedback signal. The feedback signal associated with the first radio 405 is depicted by the dashed line labeled A. This feedback signal generated by RFTL1 417 then passes through the first multi-coupler 420 and back to first radio 405. In this manner, the feedback signal produced by RFTL1 417 serves to control the first radio 405. RFTL1 417 performs various tests that ensure that first radio 405, as well as Antenna A1 365, are operating properly. In one embodiment of the present invention, RFTL1 417 may produce a feedback signal denoted by the dashed line labeled A that controls the power of first radio 405. In this example, RFTL1 417 may monitor the forward and reflected signals, perform tests on those signals, and output a feedback signal that controls the power of first radio 405.

The remaining radios, second radio 423, third radio 440, and fourth radio 458 operate in a similar manner. The output of those respective radios, which is a signal generated at a specific frequency or on a specific channel, is processed by their respective Auto Tune Combiners. The output of these Auto Tune Combiners is then filtered with the connected band pass filter and transmitted on their respective antennas after passing though their respective multi-coupler units.

RFTL1 417 and RFTL2 452 each sample two different forward and reflected signals from two different transmit paths. RFTL1 417 samples a forward and reflected signal from the transmit path associated with Antenna A1 365, as well as a forward and reflected signal associated with the transmit path of Antenna B2 380. Likewise, RFTL2 452 samples a forward and reflected signal from the transmit path associated with Antenna B1 375, as well as a forward and reflected signal from the transmit path associated with Antenna A2 370. In this embodiment, RFTL1 417 samples a forward and reflected signal from antennas on two different sectors. Likewise, RFTL2 452 also samples a forward and reflected signal from antennas on two different sectors. In this manner, RFTL1 417 and RFTL2 452, after testing their sampled signals, send feedback signals to radios that are associated with two different sectors.

The configuration of the components in the exemplary embodiment of FIG. 4 allows a wireless communications system to overcome the limitations noted in the background section. As previously described, the Auto Tune Combiners of the Ericsson RBS884 system have an 11-channel separation limitation. In addition, the radio frequency transmit loop devices also have a 4-channel separation limitation. The configuration of FIG. 4, however, allows transmission on adjacent channels in the same sector. In the simple two-sector example of FIG. 4, first radio 405 transmits on Antenna A1 365 and fourth radio 458 transmits on Antenna A2 370. These two radios that transmit in the same sector on different antennas are associated with different Auto Tune Combiners and different RFTL devices. In this manner, the signals generated by first radio 405 and fourth radio 458 do no have to respect any of the limitations associated with the channel separation for Auto Tune Combiners and radio frequency test loop devices. The signal path traced by first radio 405 is completely independent of the signal path traced by fourth radio 458. Since the signals generated by first radio 405 and fourth radio 458 do not pass through the same or sequentially connected Auto Tune Combiners or the same RTFL device, these two signals can reside on adjacent channels. Therefore, a tighter use of spectrum can be achieved in Sector A.

Likewise, in Sector B, two different radios, second radio 423 and third radio 440, are associated with two different Auto Tune Combiners, ATC2 426 and ATC3 443, as well as two different radio frequency test loop devices, RFTL1 417 and RFTL2 452. In this manner, the signals produced by second radio 423 and third radio 440 do not pass through the same or sequentially connected Auto Tune Combiners or the same RFTL device. Therefore, the channels on which second radio 423 and third radio 440 operate may be adjacent, thereby allowing a tighter use of channels in a given spectrum.

Since the signals generated by first radio 405 and second radio 423 share the same RFTL device, RFTL1 417, these two signals must be separated by at least four channels. However, the signal generated by first radio 405 is transmitted on Antenna A1 365 associated with Sector A 355, while the signal generated by second radio 423 is transmitted on Antenna B2 380 associated with Sector B 360. While the signals generated by first radio 405 and second radio 423 must be separated by four channels (because of the inherent limitation in RFTL1 417), these two signals are transmitted on two different sectors. In this manner, first radio 405 and second radio 423 may use different channel sets of FIG. 2C. The channel sets of FIG. 2C have channels that are separated by four channels or 120 KHz. Therefore, the channel separation between Sector A and Sector B in the case of first radio 405 and second radio 423 must be 120 KHz or four channels.

Likewise, the channel separation between the signals generated by third radio 440 and fourth radio 458 must also be 120 KHz or four channels. In the embodiment of FIG. 4, the signal generated by third radio 440 and the signal generated by fourth radio 458 each pass through the same RFTL device, RFTL2 452. As mentioned, RFTL2 452 has associated with it an inherent 4-channel separation limitation. Therefore, the channels utilized by third radio 440 and fourth radio 458 must be separated by 120 KHz or four channels. In this manner, third radio 440 and fourth radio 458 may use any one of the channel sets depicted in FIG. 2C. For example, third radio 440 may utilize channel 100, while fourth radio 458 utilizes channel 104. This channel selection respects the 4-channel separation limitation inherent in RFTL2 452.

Figure 2C:
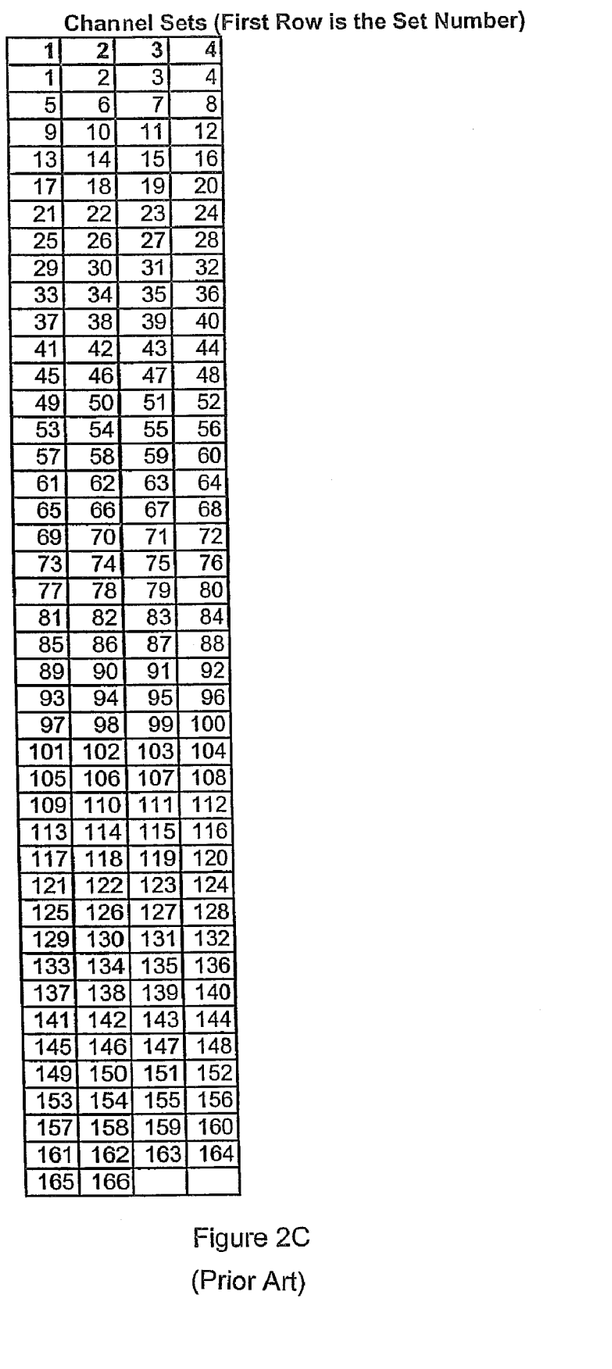
Figure 3B:
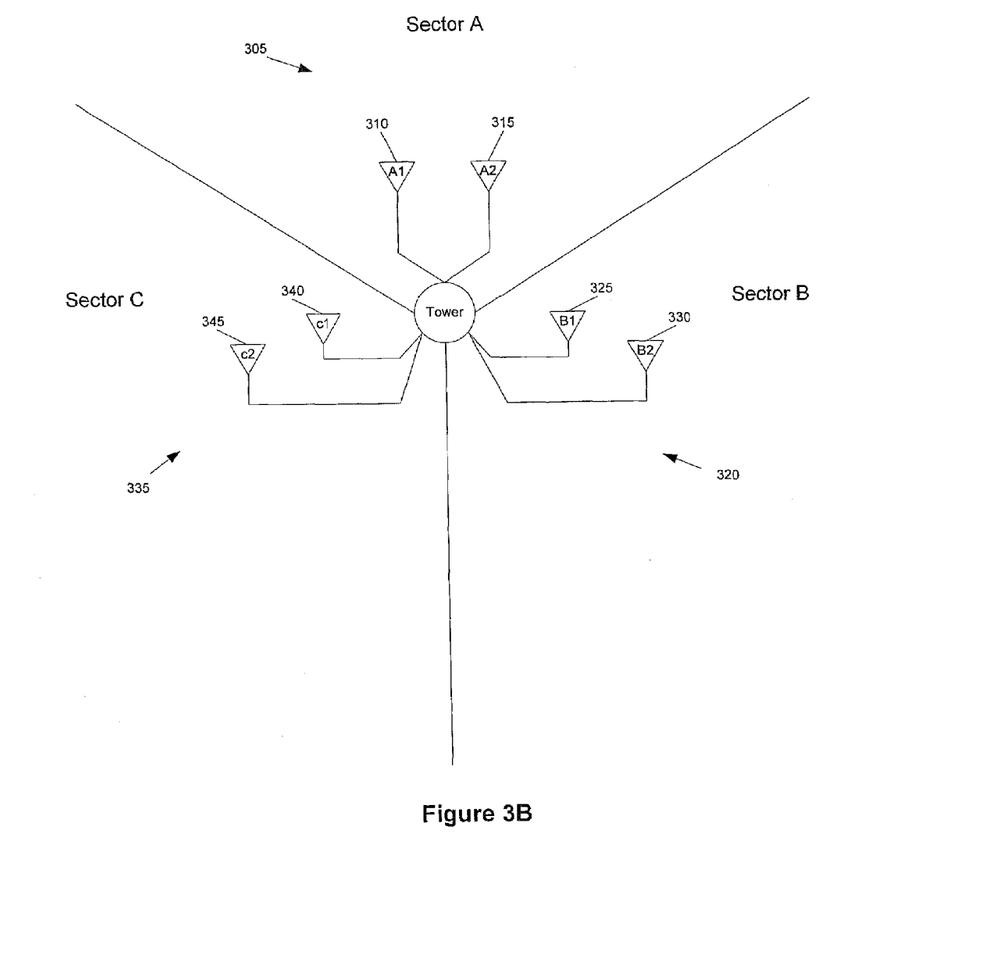
Figure 5:
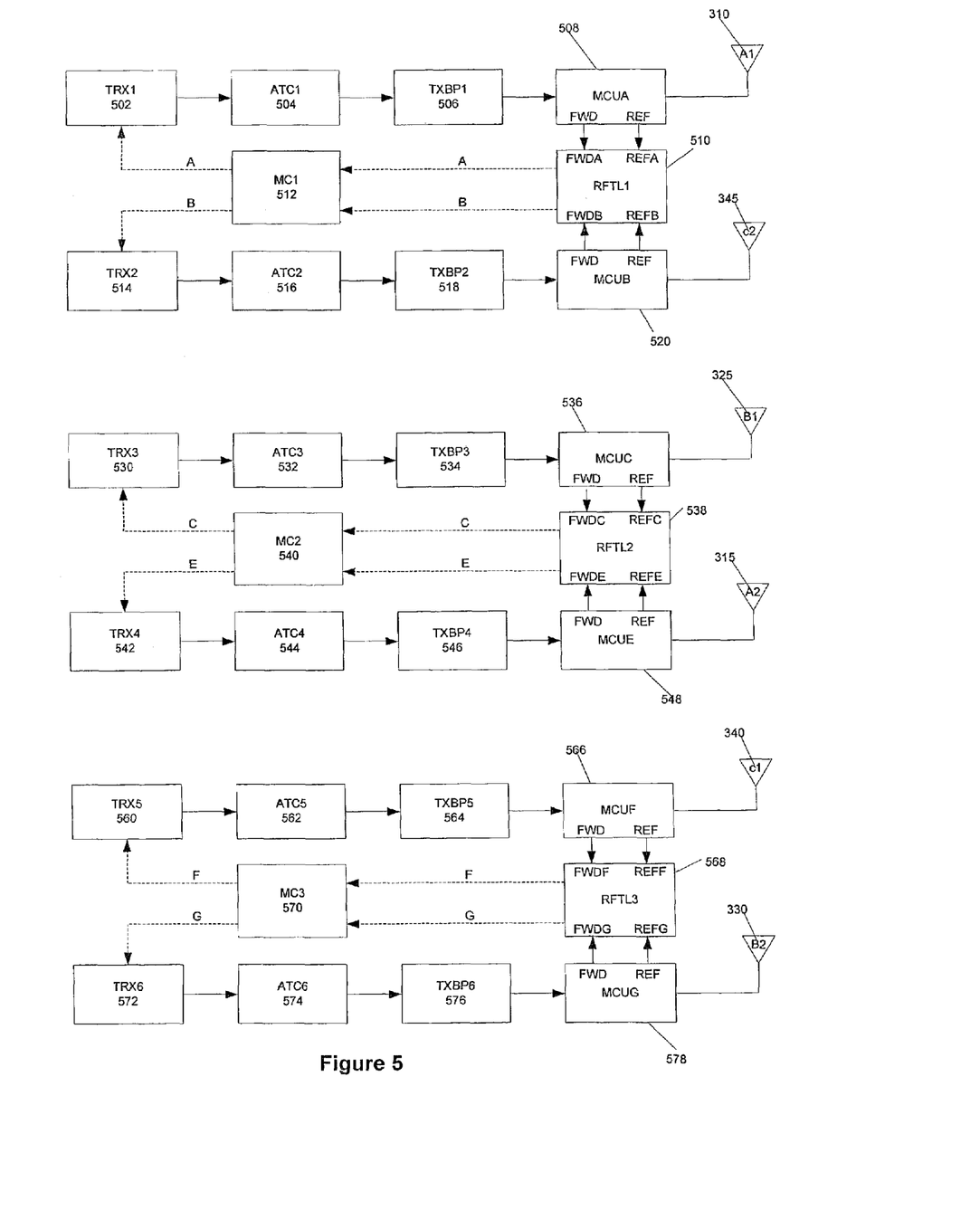
FIG. 5 is a block diagram of a wireless communications system consistent with the principles of the present invention.

In sum, by splitting the transmit paths, that is by splitting the Auto Tune Combiners, and by sharing the RFTL devices between different sectors, two radios associated with the same sector may operate on adjacent channels. The split path of the Auto Tune Combiners overcomes the 11-channel separation limitation inherent in them. The shared RFTL devices overcomes the 4-channel separation limitation for radios in the same sector. Therefore, in the configuration of FIG. 4, first radio 405 and second radio 423 may operate on a given single channel set of FIG. 2C, while third radio 440 and fourth radio 458 operate on a second different channel set of FIG. 2C. In this manner, half of the 166 allocated channel sets may be used in this simple two-sector wireless communications system FIG. 5 is a block diagram of a wireless communications system consistent with the principles of the present invention. The exemplary embodiment of FIG. 5 extends the embodiment depicted in FIG. 4 to a 3-sector communications system. A 3-sector communications system is depicted in FIG. 3B. In this typical configuration, the entire transmit area is divided into three different sectors, Sector A 305, Sector B 320, and Sector C 335. Each of these three different sectors comprises 120 degrees of transmit area. A central tower 350 forms the mounting point for the antennas in each of the three different sectors. Sector A 305 contains two antennas, Antenna A1 310 and Antenna A2 315. Sector B 320 contains two antennas, Antenna B1 325 and Antenna B2 330. Likewise, Sector C 335 contains two antennas, Antenna C1 340 and Antenna C2 345. In other embodiments consistent with the principles of the present invention, the transmit area may be divided into any number of sectors and each sector may have any number of antennas. For example, in the 3-sector communications system depicted in FIG. 3B, each of the sectors may have additional antennas (not shown).

Since each of the sectors depicted in FIG. 3B operate in a 120 degree transmit area, the antennas associated with that sector are typically directional antennas. In this case, the antennas operating in Sector A 305, for example, may be unidirectional antennas that broadcast in substantially a 120 degree field. In other embodiments consistent with the present invention, antennas associated with a particular sector may be designed to transmit in the area associated with that sector. As previously described, the antennas associated with each of the three sectors depicted in FIG. 3B, are commonly known and easily obtainable from any number of wireless equipment providers, such as Ericsson.

Referring now to FIG. 5, the components depicted are interconnected in a manner similar to that of FIG. 4. First radio 502 is connected to first Auto Tune Combiner (ATC1) 504. ATC1 504 is connected to first band pass filter 506. First band pass filter 506 is connected to first multi-coupler unit (MCU1) 508. A first antenna (Antenna A1) 310 and a first radio frequency test loop device (RFTL1) 510 are connected to MCU1 508. RFTL1 510 is connected to first multicoupler 512. First multi-coupler 512 is connected to first radio 502 and second radio 514. Second radio 514 is connected to second Auto Tune Combiner (ATC2) 516. ATC2 516 is connected to second band pass filter 518. Second band pass filter 518 is connected to second multi-coupler unit (MCU2) 520. A second antenna associated with Sector C (Antenna C2) 345, as well as RFTL1 510, are connected to MCU2 520.

The remaining two sets of components depicted in FIG. 5 are connected in the same manner. Third radio 530 is connected to third Auto Tune Combiner (ATC3) 532 which is then connected to third band pass filter 534 which is then connected to third multi-coupler unit (MCU3) 536. A first antenna associated with Sector B (Antenna B1) 325, as well as a second radio frequency test loop device (RFTL2) 538, are connected to MCU3 536. RFTL2 538 is connected to second multi-coupler 540 which is then connected to third radio 530 and fourth radio 542. Fourth radio 542 is connected to fourth Auto Tune Combiner (ATC4) 544 which is then connected to fourth band pass filter 546. Fourth band pass filter 546 is connected to fourth multi-coupler unit (MCU4) 548. A second antenna associated with Sector A (Antenna A2) 315, as well as RFTL2 538, are connected to MCU4 548.

In a similar fashion, fifth radio 560 is connected to fifth Auto Tune Combiner (ATC5) 562 which is then connected to fifth band pass filter 564 which is then connected to fifth multi-coupler unit (MCU5) 566. A first antenna associated with Sector C (Antenna C1) 340 and a third radio frequency test loop device (RFTL3) 568 are connected to MCU5 566. A sixth radio 572 is connected to a sixth Auto Tune Combiner (ATC6) 574 which is then connected to a sixth band pass filter 576 which is then connected to a sixth multi-coupler unit (MCU6) 578. A second antenna associated with Sector B (Antenna B2) 330, as well as RFTL3 568, are connected to MCU6 578. RFTL3 568 is connected to third multi-coupler 570. Third multi-coupler 570 is connected to fifth radio 560 and sixth radio 572.

The components of the exemplary embodiment depicted in FIG. 5 possess the same qualities and characteristics of the components described in reference to FIG. 4. For example, first radio 502 of FIG. 5 and first radio 405 of FIG. 4 may be 30 Watt radios. Likewise, the Auto Tune Combiners of FIGS. 4 and 5 operate in a similar manner and possess similar characteristics. In addition, the band pass filters, multi-coupler units, radio frequency test loop devices, multicouplers, and antennas depicted in FIG. 5 possess the same qualities and characteristics of the like devices depicted in FIG. 4.

In another aspect consistent with the principles of the present invention, each of the first through sixth radios, 502, 514, 530, 542, 560, and 572, may comprise multiple radio sources. For example, first radio 502 may contain, for example, seven different radios sources. Therefore, the depiction of first radio 502 in FIG. 5 is consistent with seven radios. In this manner, Antenna A1 310 may have seven radios associated with it. Likewise, ATC1 504 may contain seven Auto Tune Combiners, one each for the seven radios comprising first radio 502. Any number of radios and associated Auto Tune Combiners may be interconnected for transmission on any single antenna in a specific sector. The principles of the present invention are equally applicable to numerous radio configurations and not just the single radio per antenna configuration depicted in FIG. 4 and FIG. 5.

The operation of the components depicted in FIG. 5 is also similar to the operation of the components previously described with respect to FIG. 4. For example, first radio 502 produces a radio signal at a specific frequency or on a specific channel. That signal is then processed by ATC1 504. The output of ATC1 504, which is the processed signal generated by first radio 502, is then filtered by first band pass filter 506. This filtered signal is then passed through MCU1 508 for transmission on Antenna A1 310. RFTL1 510 via a forward signal port and a reflected signal port contained in MCU1 508 samples the forward signal and reflected signal. RFTL1 510, as previously described, performs various tests on the forward signal and reflected signal and sends a feedback signal, denoted by the dashed line, through first multi-coupler 512 and to first radio 502. RFTL1 510 through ports on MCU2 520 samples the forward signal and reflected signal of the transmit path associated with Antenna C2 345. In this manner, RFTL1 510 samples two sets of forward and reflected signals from two different antennas operating in two different sectors. RFTL1 510, after performing tests on these signals, sends two different feedback signals through first multi-coupler 512 to first radio 502 and second radio 514. These feedback signals are depicted by dashed lines labeled with the letters A and B, with the feedback signal labeled A passing from RFTL1 510 to first radio 502 and the feedback signal labeled B passing from RFTL1 510 to second radio 514.

The two other sets of radios depicted in FIG. 5 operate in the same fashion as the first set just described. Each of these two other sets of components have two different transmit paths. The second set of components depicted in the middle of FIG. 5 has two different transmit paths, one associated with Antenna B1 325 and another associated with Antenna A2 315. In this manner, RFTL2 538 samples a forward single and a reflected signal from each of the two transmit paths associated with Antenna B1 325 and Antenna A2 315. These two transmit paths also operate on two different sectors. In this manner, RFTL2 538 samples forward and reflected signals from antennas operating on two different sectors.

Likewise, RFTL3 568 samples a forward and reflected signal from a transmit path associated with Antenna C1 340, as well as a forward and reflected signal from a transmit path associated with Antenna B2 330. Just as in the previous two sets of components, RFTL3 568 samples a forward and reflected signal from two different transmit paths associated with two different sectors. In this case, RFTL3 568 samples a forward and reflected path from antennas associated with Sectors B and C.

Just as in the system described in FIG. 4, the system depicted in FIG. 5 possesses a configuration of RFTL devices that sample forward and reflected signals from transmission paths of different sectors. The description of the operation of the components of FIG. 4, as well as their interaction in the system depicted in FIG. 4, is analogous to the components and system depicted in FIG. 5.

The system depicted in FIG. 5 overcomes the same 11-channel separation limitation and 4-channel separation limitation inherent in the Auto Tune Combiner and radio frequency transmit loop device, respectively. Just as in FIG. 4, the Auto Tune Combiners depicted in FIG. 5 carry with them an 11-channel separation limitation. In a similar manner, the radio frequency test loop devices depicted in FIG. 5 possess a 4-channel separation limitation. By sharing an RFTL device between different transmit paths on different sectors, the 4-channel limitation is overcome for a given sector. Additionally, the shared RFTL device configuration of FIGS. 4 and 5 reduce the number of components that are necessary to operate a wireless transmission site. As is plainly seen in FIG. 5, only three RFTL devices are necessary for a given six set of radios transmitting in three different sectors on six different antennas. Instead of having a separate RFTL device associated with each antenna, the shared configuration of FIG. 5 allows for an RFTL device to monitor two different transmit paths.

As seen in the example of FIG. 5, first radio 502 is the origination point for the transmit path associated with Antenna A1 310. Fourth radio 542 is the origination point for the transmit path associated with Antenna A2 315. As discussed, Antenna A1 310 and Antenna A2 315 both transmit in Sector A 305. By splitting the transmit path between two different sets of devices, the 11-channel limitation associated with the Auto Tune Combiner and the 4-channel limitation associated with the RFTL device is overcome. In this case, a signal generated by first radio 502, after processing and filtering, is transmitted on Antenna A1 310 in Sector A 305. Likewise, a signal generated by a fourth radio 542, after processing and filtering, is transmitted on Antenna A2 315 in Sector A 305. Since the signal generated by first radio 502 and the signal generated by fourth radio 542 do not pass through any of the same components, and more specifically, the same or sequentially connected Auto Tune Combiners and the same RFTL device, these two signals can reside on adjacent channels. Therefore, a tighter use of an allotted spectrum can be maintained in Sector A.

Likewise, the same result is achieved in Sectors B and C, 320 and 335. In Sector B, a signal generated by third radio 530, after being processed and filtered, is transmitted on Antenna B1 325 in Sector B 320. A signal generated by a sixth radio 572, after being processed and filtered, is transmitted on Antenna B2 330 in Sector B 320. Since the signals generated by the third radio 530 and the sixth radio 572 do not share any of the same components, and more specifically, the same or sequentially connected Auto Tune Combiners and the same radio frequency test loop device, these two signals can reside on adjacent channels. The same is true for Sector C. A signal generated by second radio 514 and later transmitted on Antenna C2 345, as well as a signal generated by fifth radio 560 and later transmitted on Antenna C1 340, may reside on adjacent channels because these two signals do not pass through the same or sequentially connected Auto Tune Combiners or the same RFTL device.

As described in reference to FIG. 4, first radio 502 and second radio 514 of FIG. 5, since they share the same RFTL device, RFTL1 510, must respect the 4-channel separation limitation inherent in that RFTL device. As mentioned, signals that pass through a single RFTL device must be separated by four channels or, in this case, 120 KHz. With reference to FIG. 2C, this means that first radio 502 and second radio 514 must use channels of any one of the channel sets depicted in FIG. 2C. For example, if first radio 502 and second radio 514 choose to use channel set three, then first radio 502 may broadcast on channel 111, while second radio 514 may broadcast on channel 115. In this manner, the signals generated by first radio 502 and second radio 514 maintain the 4-channel separation limitation required by RFTL1 510. However, since the signal generated by first radio 502 is eventually transmitted in Sector A 305 on Antenna A1 310 and the signal generated by second radio 514 is eventually transmitted in Sector C 335 on Antenna C2 345, this 4-channel separation limitation is imposed between different sectors and not in the same sector.

In sum, because of the shared RFTL device configuration, the signals transmitted on Antenna A1 310 and Antenna C2 345 must be four channels apart. Likewise, the signals transmitted on Antenna B1 325 and Antenna A2 315, as well as the signals transmitted on Antenna C1 340 and Antenna B2 330, must also be four channels apart. With reference to FIG. 2C, 75% of the channels depicted in FIG. 2C may be used simultaneously with the implementation of the wireless communications system depicted in FIG. 5. For example, first radio 502 and second radio 514 may choose a single channel set depicted in FIG. 2C (since these channel sets are four channels apart, therefore, respecting the 4-channel separation limitation inherent in the RFTL device). Likewise, third radio 530 and fourth radio 542 may choose another different channel set from FIG. 2C and fifth radio 560 and sixth radio 572 may choose a third different channel set from FIG. 2C. In this manner, for example, first radio 502 and second radio 514 may choose to transmit on channel set three, third radio 530 and fourth radio 542 may choose to transmit on channel set two, and fifth radio 560 and sixth radio 572 may choose to transmit on channel set one. In this configuration, the number of channels that may be used in a given spectrum is greatly increased.

If the transmission area were divided into four sectors, each with two different antennas, then every single channel depicted in the four channel sets of FIG. 2C would be available for use. In this configuration (not shown), the four different sets of radios (not shown) associated with the four different sectors could each utilize one of the four different channel sets depicted in FIG. 2C. In this manner, the principles of the present invention can be extended to a communications system with any number of different sectors.

In a further embodiment consistent with the principles of the present invention, the block diagram of FIG. 5 may represent multiple radios. For example, first radio 502 may comprise seven different radio sources. In this manner, first radio 502, comprised of seven different radios, transmit their seven different signals on Antenna A1 310. The same configuration may be implemented in the second through sixth radios, 514, 530, 542, 560, and 572. In this manner, each of the sets of radios may contain seven different radio sources for a total of 42 radios. For example, seven radios may generate signals that are later transmitted on Antenna A1 310 and a separate set of seven radios may generate signals that are transmitted on Antenna A2 315. In this configuration, 14 radios broadcast on two different antennas associated with a single sector.

In this case, the seven radios associated with Antenna A1 310 each pass through the same set of Auto Tune Combiners 504. In this manner, the seven different signals produced by the seven different radios (depicted by first radio 502) are processed and combined by first Auto Tune Combiner (or first set of Auto Tune Combiners) 504. The resulting signal which is output from ATC1 504 is then filtered by first band pass filter 506 and transmitted on Antenna A1 310. Since seven different radios (depicted by first radio 502) are processed by seven interconnected Auto Tune Combiners (depicted by ATC1 504), these seven signals must respect the 11-channel separation limitation inherent in Auto Tune Combiners. In this case, the set of radios whose signals are transmitted on Antenna A1 310 must be separated by eleven channels or 330 KHz. With reference to FIG. 2B, this means that the set of radios whose signals are transmitted on Antenna A1 310 may operate on any one of the eleven channel sets depicted in FIG. 2B. Likewise, the set of radios whose signals are transmitted on Antenna C2 345 may operate on a set of channels depicted in FIG. 2B. Since the first set of radios and the second set of radios share the same RFTL device, RFTL1 510, the sets of channels that these two different sets of radios select must be separated by four channels. For example, the first set of radios whose signal is transmitted on Antenna A1 310 may select channel set one of FIG. 2B. The second set of radios whose signal is transmitted on Antenna C2 345 may select channel set four of FIG. 2B. In this manner, the channels that are broadcast on these two antennas are separated by eleven channels within the set and four channels between the sets.

This configuration, even with multiple sets of radios broadcasting on a single antenna associated with a single sector, allows for increased use of the number of channels in a fixed spectrum. For example, the first set of radios, whose signal is transmitted on Antenna A1 310, may use channel set number one, while the second set of radios, whose signal is transmitted on Antenna C2 345, may use channel set four. In a similar manner, a third set of radios, whose signals are transmitted on Antenna B1 325, may select channel set two, while a fourth set of radios, whose signals are transmitted on Antenna A2 315, may select channel set five of FIG. 2B. A fifth set of radios, whose signals are transmitted on Antenna C1 340, may select channel set three, and a sixth set of radios, whose signals are transmitted on Antenna B2 330, may select channel set six. In this manner, for the three sector communications system depicted in FIG. 3B, six of the eleven channel sets depicted in FIG. 2B may be utilized simultaneously, thus increasing the amount of spectrum use in a given sector.

The principles of the present invention depicted in FIGS. 4 and 5 may be extended to a five-sector communications system. In a five-sector communications system (not shown), with two antennas per sector, most of the channel sets depicted in FIG. 2B can be utilized. For example, in a five-sector communications system, with two antennas per sector and multiple radios per antenna, ten of the eleven channel sets depicted in FIG. 2B can be utilized simultaneously. In fact, the principles of the present invention can be used in any type of multi-sector wireless communications system with the result of improved spectrum use.

Figure 6:
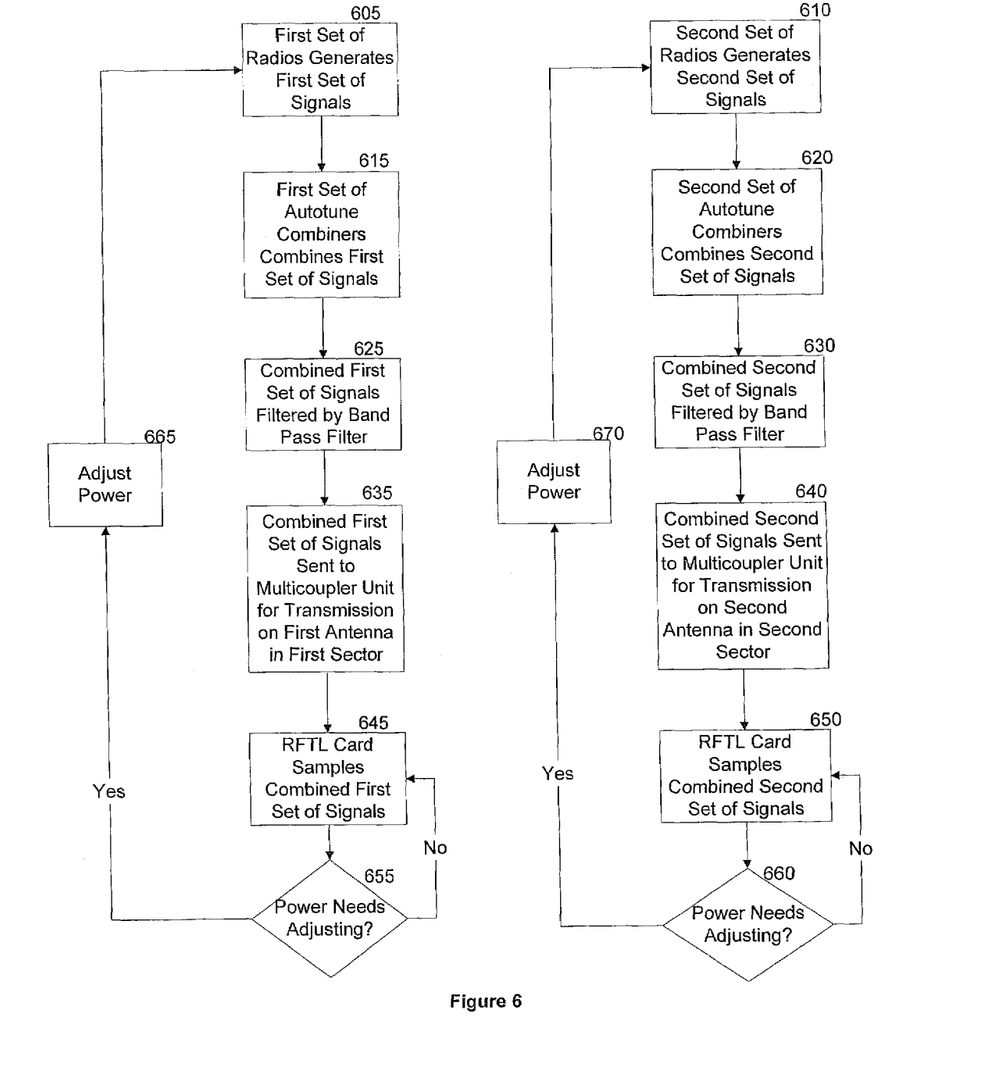
FIG. 6 is a flow chart depicting the operation of a wireless communications system consistent with the principles of the present invention.

FIG. 6 is a flow chart depicting an exemplary operation of the present invention. The two different flow charts depicted in FIG. 6 proceed in parallel. In this manner, the processes of each of these two flow charts are performed simultaneously.

In step 605, a first set of radios generates a first set of signals. In step 615, a first set of Auto Tune Combiners combines the first set of signals. Flow then proceeds to step 625 in which the combined first set of signals is filtered by a band pass filter. In step 635, the combined first set of signals is sent to a multicoupler unit for transmission on a first antenna in a first sector. In step 645, an RFTL card samples the combined first set of signals. This RFTL card, as previously described, performs tests on this first set of sampled signals. One of these tests, for example, may be a test to determine whether one of the first set of radios needs its power adjusted. This test is depicted in step 655 in which the RFTL card determines whether the power of one of the first set of radios needs adjusting. If the power does not need adjusting, then flow proceeds to step 645, in which the RFTL card continues to sample the combined first set of signals. If the power does need adjusting, then flow proceeds to step 665, in which the power of one of the radios of the first set of radios is adjusted.

In a similar parallel flow, a second set of radios generates a second set of signals in step 610. In step 620, a second set of Auto Tune Combiners combines the second set of signals. Flow then proceeds to step 630, in which the combined second set of signals is filtered by a band pass filter. In step 640, the combined second set of signals is sent to a multi-coupler unit for transmission on a second antenna in a second sector. Flow then proceeds to step 650, in which an RFTL card samples the combined second set of signals. As previously described, the RFTL card samples a forward and reflected signal from a given transmit path associated with a given antenna. The RFTL card, as previously described, performs various tests on these signals to determine if the wireless communications system is operating at a proper power. For example, the RFTL card may perform a test in which it determines whether one of the radios in the second set of radios is operating properly. This exemplary test is depicted in step 660. In step 660, the RFTL card determines whether one of the radios in the second set of radios needs its power adjusted. If the radio does not need its power adjusted, then flow proceeds to step 650, in which the RFTL card samples the combined second set of signals. If one of the radios in the second set of radios needs its power adjusted, then flow proceeds to step 670 in which the power of the radio is adjusted. From that point, flow returns to step 610, in which the second set of radios generates a second set of signals.

As previously described, the parallel flow of FIG. 6, and more specifically, steps 645 and 650, occur with one radio frequency test loop device. In this case, the RFTL card mentioned in step 645 and step 650 are the same RFTL device. In this manner, the RFTL card of step 645 and step 650 samples both the first set of radio signals and the second set of radio signals.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-sector cellular transmitter comprising:
a first antenna configured to communicate in a first sector;
a second antenna configured to communicate in the first sector;
a third antenna configured to communicate in a second sector;
a fourth antenna configured to communicate in the second sector;
a first radio frequency test loop device configured to measure a signal transmitted on the first antenna and to measure a signal transmitted on the third antenna; and
a second radio frequency test loop device configured to measure a signal transmitted on the second antenna and to measure a signal transmitted on the fourth antenna.

2. The transmitter of claim 1, wherein:
the first radio frequency test loop device has a minimum channel separation requirement; and
a first signal and a second signal are transmitted in the first sector, the first signal and the second signal having a channel separation that is less than the minimum channel separation requirement of the first radio frequency test loop device.

3. The transmitter of claim 2, wherein the first signal is transmitted on the first antenna and the second signal is transmitted on the second antenna.

4. The transmitter of claim 2, wherein:
the second radio frequency test loop device has a minimum channel separation requirement; and
a third signal and a fourth signal are transmitted in the second sector, the third signal and the fourth signal having a channel separation that is less than the minimum channel separation requirement of the second radio frequency test loop device.

5. The transmitter of claim 4, wherein the third signal is transmitted on the third antenna and the fourth signal is transmitted on the fourth antenna.

6. The transmitter of claim 1 further comprising:
a first radio;
a first auto tune combiner for receiving a first signal from the first radio and outputting a processed first signal;
a first bandpass filter for filtering the processed first signal to generate a filtered first signal; and
a first multicoupler unit for receiving the filtered first signal, sending the filtered first signal to the first antenna, and providing measuring ports to the first radio frequency test loop device.

7. The transmitter of claim 6 further comprising:
a second radio;
a second auto tune combiner for receiving a second signal from the second radio and outputting a processed second signal;
a second bandpass filter for filtering the processed second signal to generate a filtered second signal; and
a second multicoupler unit for receiving the filtered second signal, sending the filtered second signal to the second antenna, and providing measuring ports to the second radio frequency test loop device.

8. The transmitter of claim 7, wherein:
the first auto tune combiner has a minimum channel separation requirement for additional auto tune combiners in the same transmit path; and
the first signal and the second signal have a channel separation that is less than the minimum channel separation requirement of the first auto tune combiner.

9. The transmitter of claim 6 further comprising:
a third radio;
a third auto tune combiner for receiving a third signal from the third radio and outputting a processed third signal;
a third bandpass filter for filtering the processed third signal to generate a filtered third signal; and
a third multicoupler unit for receiving the filtered third signal, sending the filtered third signal to the third antenna, and providing measuring ports to the first radio frequency test loop device.

10. The transmitter of claim 9 further comprising:
a fourth radio;
a fourth auto tune combiner for receiving a fourth signal from the fourth radio and outputting a processed fourth signal;
a fourth bandpass filter for filtering the processed fourth signal to generate a filtered fourth signal; and
a fourth multicoupler unit for receiving the filtered fourth signal, sending the filtered fourth signal to the fourth antenna, and providing measuring ports to the second radio frequency test loop device.

11. The transmitter of claim 10, wherein:
the third auto tune combiner has a minimum channel separation requirement for additional auto tune combiners in the same transmit path; and
the third signal and the fourth signal have a channel separation that is less than the minimum channel separation requirement of the third auto tune combiner.

12. A multi-sector cellular transmitter comprising:
a first antenna configured to communicate in a first sector;
a second antenna configured to communicate in the first sector;
a third antenna configured to communicate in a second sector;
a fourth antenna configured to communicate in the second sector;
a fifth antenna configured to communicate in a third sector;
a sixth antenna configured to communicate in the third sector;
a first radio frequency test loop device configured to measure a signal transmitted on the first antenna and to measure a signal transmitted on the sixth antenna;
a second radio frequency test loop device configured to measure a signal transmitted on the second antenna and to measure a signal transmitted on the third antenna; and
a third radio frequency test loop device configured to measure a signal transmitted on the fourth antenna and to measure a signal transmitted on the fifth antenna.

13. The transmitter of claim 12, wherein:
the first radio frequency test loop device has a minimum channel separation requirement; and
a first signal and a second signal are transmitted in the first sector, the first signal and the second signal having a channel separation that is less than the minimum channel separation requirement of the first radio frequency test loop device.

14. The transmitter of claim 13, wherein the first signal is transmitted on the first antenna and the second signal is transmitted on the second antenna.

15. The transmitter of claim 12, wherein:
the second radio frequency test loop device has a minimum channel separation requirement; and
a third signal and a fourth signal are transmitted in the second sector, the third signal and the fourth signal having a channel separation that is less than the minimum channel separation requirement of the second radio frequency test loop device.

16. The transmitter of claim 15, wherein the third signal is transmitted on the third antenna and the fourth signal is transmitted on the fourth antenna.

17. The transmitter of claim 12, wherein:
the third radio frequency test loop device has a minimum channel separation requirement; and
a fifth signal and a sixth signal are transmitted in the third sector, the fifth signal and the sixth signal having a channel separation that is less than the minimum channel separation requirement of the third radio frequency test loop device.

18. The transmitter of claim 17, wherein the fifth signal is transmitted on the fifth antenna and the sixth signal is transmitted on the sixth antenna.

19. A multi-sector cellular transmitter comprising:
a first antenna configured to transmit in a first sector;
a second antenna configured to transmit in a second sector;
a first radio frequency test loop device configured to monitor a transmit path associated with the first antenna and configured to monitor a transmit path associated with the second antenna;
a third antenna configured to transmit in a first sector;
a fourth antenna configured to transmit in a second sector; and
a second radio frequency test loop device configured to monitor a transmit path associated with the third antenna and configured to monitor a transmit path associated with the fourth antenna.

* * * * *